(12) United States Patent
Bateman et al.

(10) Patent No.: US 7,274,308 B2
(45) Date of Patent: Sep. 25, 2007

(54) EGPWS FLAP POSITION ENHANCEMENT

(75) Inventors: Charles Donald Bateman, Bellevue, WA (US); David Bryan Alexander Fleming, Kirkland, WA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 11/164,808

(22) Filed: Dec. 6, 2005

(65) Prior Publication Data

US 2007/0126602 A1   Jun. 7, 2007

(51) Int. Cl.
  *G08G 5/00* (2006.01)
(52) U.S. Cl. .................. 340/959; 340/945; 340/963; 701/9; 701/14
(58) Field of Classification Search ............. 340/945, 340/959, 963, 969, 971, 970, 973, 977, 966, 340/967; 73/178 T; 701/3, 9, 14, 15
See application file for complete search history.

(56) References Cited

U.S. PATENT DOCUMENTS 3,192,503 A   6/1965   Lang
4,121,194 A * 10/1978  Downey et al. ............ 340/959
5,353,022 A  10/1994   Middleton et al.
5,499,025 A *  3/1996  Middleton et al. .......... 340/959
5,519,391 A *  5/1996  Paterson et al. ............ 340/959
2005/0128129 A1  6/2005  Conner et al.

* cited by examiner

*Primary Examiner*—Brent A. Swarthout
(74) *Attorney, Agent, or Firm*—Black Lowe & Graham PLLC

(57) ABSTRACT

A processor, software code, and a method for generating warning indicating that flaps are not suitably in a take-off position. A first component is configured to receive a first signal indicative of one of a group of flaps positions, the group including a take-off position. A second component is configured to receive a second signal indicative of an aircraft position. A third component is configured to compare the aircraft position to the contents of a database and to, by the comparison, determine whether the aircraft position is within a runway perimeter. A fourth component is configured to generate an alarm when the aircraft is within the runway perimeter and the flaps position is not the take-off position.

20 Claims, 3 Drawing Sheets

US 7,274,308 B2

EGPWS FLAP POSITION ENHANCEMENT

BACKGROUND

Proper procedure for a commercial aircraft to take-off from a given runway includes as a first step the selection or an initiation of take-off flaps. Referring to FIG. 1, a prior art wing assembly 10 includes a wing body 11. Attached to the wing body 11 is a slat 13 and a flap assembly 15. The flap assembly 15 includes a first flap 15A, a second flap 15B, and a third flap 15C are designatively extended from the wing body 11 upon take-off. By extending the slat 13 and the flap assembly 15, the pilot increases the surface area of the wing assembly 10 while enhancing the curvature or chord of the upper wing surface to greatly enhance the lift generated as the wing assembly 10 passes through the air. The enhanced lift generated by the extension of the slat 13 and the flap assembly 15 enables the heavily ladened aircraft to take-off from the runway.

Failure to extend the flap assembly 15 and, where available, the slat 13 may have catastrophic consequences as in the 5 Sep. 2005 take-off accident at Medan, Indonesia when a B-737 aircraft failed to generate suitable lift on take-off due to the failure to extend the slat 13 and the flap assembly 15. The pilot, after entering the runway, had not set the flaps for take-off. Once the pilot had noticed the flaps, the aircraft was already "at speed." Lacking sufficient lift, the aircraft crashed shortly after takeoff. No aircraft malfunction was noted.

What is needed, then, in the art are systems and methods for generating an enunciated warning when the flap assembly 15 is not extended before take-off from a runway.

BRIEF SUMMARY OF THE INVENTION

A processor, software code, and a method are presented for generating warning indicating that flaps are not suitably in a take-off position. A first component is configured to receive a first signal indicative of one of a group of flaps positions, the group including a take-off position. A second component is configured to receive a second signal indicative of an aircraft position. A third component is configured to compare the aircraft position to the contents of a database and to, by the comparison, determine whether the aircraft position is within a runway perimeter. A fourth component is configured to generate an alarm when the aircraft is within the runway perimeter and the flaps position is not the take-off position.

BRIEF DESCRIPTION OF THE FIGURES

The preferred and alternative embodiments of the present invention are described in detail below with reference to the following drawings.

DETAILED DESCRIPTION OF THE INVENTION

Figure 2:
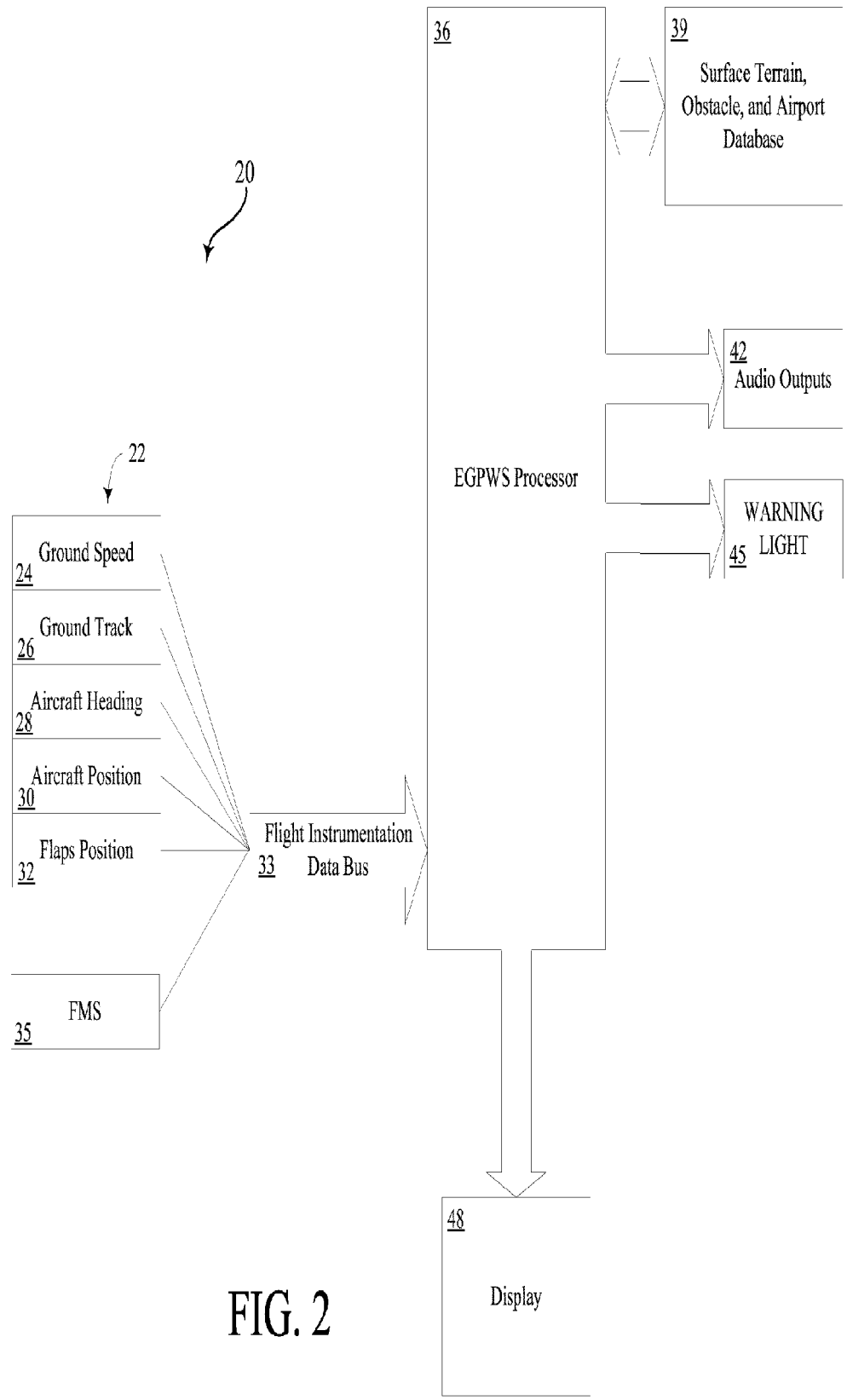
FIG. 2 is a block diagram of an EGPWS processor assembly.

FIG. 2 indicates an enhanced grown proximity warning system ("EGPWS") processor assembly 20 including an EGPWS processor 36 in operative communication with a database 39, the database 39 configured to contain surface terrain, obstacle, and airport information including information as to the location of airport runways. Additionally, the EGPWS processor 36 receives information from a sensor assembly 22. By way of non-limiting example, the sensor assembly 22 includes a ground speed sensor 24, a ground track sensor 26, an aircraft heading sensor 28, and an aircraft position sensor 30. Operative communication between the EGPWS processor 36 and the sensor assembly 22 is facilitated by a flight instrumentation data bus 33. The flight information data bus 33 may be any communicative linkage between either the sensor assembly 22 as a whole or a network of communicative links between each of the distinct sensors such as the aircraft position sensor 30. The EGPWS processor 36 is configured to output information through one or more of an audio output 42, a warning light 45, and a display 48 such as a heads up display or an instrument panel configured to include a cathode ray tube or other form of video graphic display.

Beginning at the aircraft position sensor 30, a position of the aircraft is derived. Non-limiting examples of an aircraft position sensor 30 would be a global positioning satellite ("GPS") receiver configured to derive an aircraft position based upon received timing signals. Other such aircraft position sensors include LORAN and other radio triangulation systems. The invention is not limited to devices that are autonomous within the aircraft. The aircraft position sensor 30 may also include receiving means configured to receive an aircraft position from an outside source such as a ground traffic control facility or via LAAS (Local Area Augmentation System) or WAAS (Wide Area Augmentation System).

Communicated to the EGPWS processor 36 through the flight instrumentation data bus 33, the aircraft's position is compared to the contents of the database 39 to determine if the aircraft is within a defined perimeter surrounding runways stored within the database 39.

For the purposes of an embodiment, the flap assembly 15 (FIG. 1) need be extended only within the perimeter defining the runway resident in the database 39. Embodiments presume the aircraft will only take-off on runways existing within the database 39. A special case occurs where two runway's resident within the database 39 are defined to cross. Crossing runways are frequently used to maximize the utility of airport installations by allowing more frequent landings from distinct directions. For the purposes of this application, one runway resident in the database 39 will include both of the distinct nomenclature when a runway is used for approaches in diametrically opposed directions. For instance, a runway running from north to south is alternately described as runway 36 or runway 18 depending upon whether the use is from the north or the south.

In at least one embodiment, the EGPWS processor 36 is in operative communication with a flight management system ("FMS"). The FMS 35 provides to the EGPWS processor 36 information relating to the anticipated flight plan that is used for azimuth and vertical profiles of operation of a commercial aircraft.

Advantageously, the FMS 35 can communicate with the EGPWS processor assembly 20 by means of the EGPWS processor 36 connected through the flight instrumentation data bus 33. In FIG. 2, information from the FMS 35 indicates when the aircraft is in a portion of the flight plan that is dedicated to preparation for take-off as that flight plan is programmed into the FMS 35. After confirming the aircraft is at a position from which a take off has been programmed, the EGPWS processor 36 then by confirming that the aircraft is currently preparing for the take-off maneuver, the EGPWS processor 36 then checks the state of the flaps by means of the flap position sensor 32. Connection with the FMS 35 obviates the need for the optional reference to aircraft ground speed 24 is necessary then only to confirm that the aircraft is in take-off configuration though such confirmation is not necessary to accurately predict take-off.

By such means as provided to the EGPWS processor 36, the processor 36 determines that the aircraft is in pre-take-off mode, the processor 36 is configured to generate a warning to the pilot with suitable lead time to allow pilot correction of the error before committing to the take-off.

Embodiments include a software code stored upon a machine-readable medium (not shown) to instruct the EGPWS processor 36 to generate a warning. The software code directs the processor 36 to receive a first signal generated by the flap position sensor 32. The flap position sensor 32 is configured to sense when the flaps are in a take-off position, though, optionally, the flap position sensor 32 may be additionally configured to sense the flaps in a number of distinct positions.

The software code further directs the EGPWS processor 36 to compare a signal received from the aircraft position sensor 30 to the contents of the database 39. By the comparison, the EGPWS processor 36 determines whether the aircraft position is within the runway perimeter, taking the results of the comparison and designating the containing runway perimeter for purposes of later comparison to signals received from either of the ground track sensor 26, the aircraft heading sensor 28, or from signals from the FMS 35. The EGPWS processor 36 generates an alarm when the aircraft is within the runway perimeter and the flaps position is not the take-off position.

Figure 1:
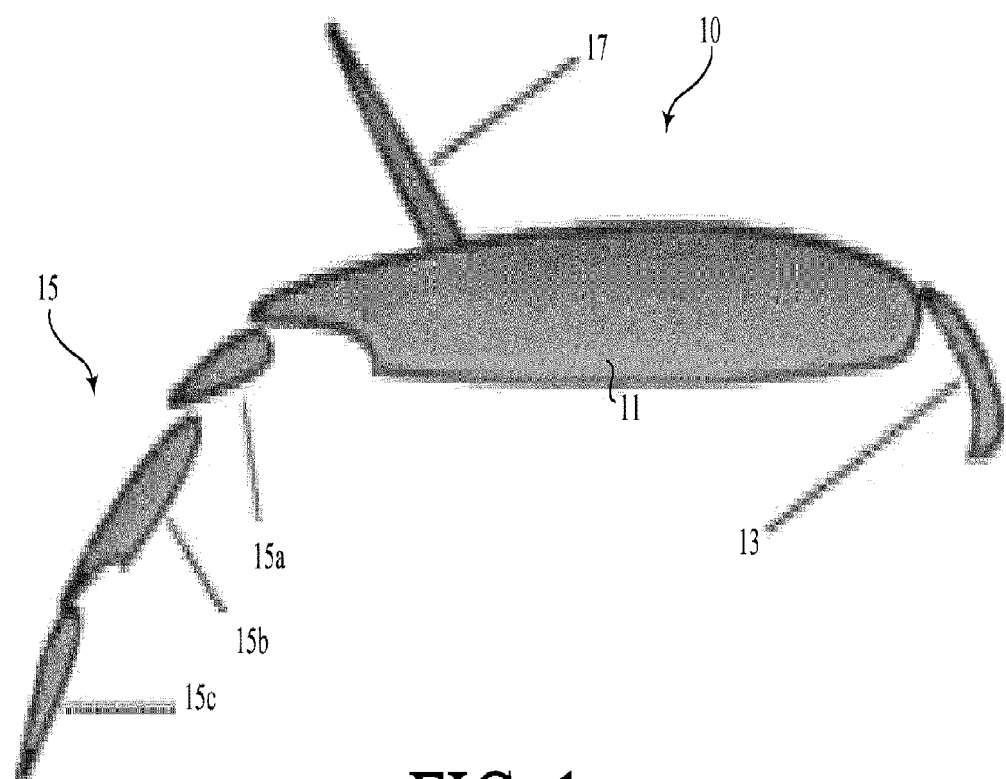
FIG. 1 is a cross-section of a wing assembly according to the prior art.

In another embodiment, the software code directs the EGPWS processor 36 to receive an aircraft ground speed from the aircraft ground speed sensor 24; and then is optionally configured to suppress the alarm when the ground speed exceeds a threshold ground speed. The threshold ground speed may be designatable in some embodiments. Such an optional feature is useful in the suitable suppression of alarms on board aircraft that enter the perimeter by means of a landing maneuver. Once the landing occurs, the flap assembly 15 becomes superfluous for further flight and is appropriately retracted into the wing body 10 (FIG. 1). During the landing, the retraction may occur at speeds in excess of those normally used to enter the runway from taxiways and therefore are not preparatory to take-off.

A distinct optional means of suitably suppressing the generation of alarms is based upon the heading of the aircraft relative to the runway direction. The difference between the heading of the aircraft and runway direction is known as a track angle. The EGPWS processor 36 will suppress the alarm when the runway track angle exceeds a threshold runway track angle, because it is unlikely that the aircraft would take off at headings wherein the track angle would exceed a designatable threshold.

Where an aircraft heading is not directly sensed from a compass or a navigation system, the aircraft heading may be derived from a vector difference between a first aircraft position and a second aircraft position. A second runway position is arbitrarily an aircraft position later in time than a first runway position. In alternate embodiments, the aircraft heading is sensed by a compass. Such compasses might include gyro compasses, ring laser gyros, or magnetic compasses.

The alarm is enunciated through any of the audio output 42, the warning light 45, or a warning generated on the screen display 48. The audio output 42 may be as simple as a buzzer activated according to the EGPWS processor 36 or a synthesized or recorded voice indicating that the flaps are not in a take-off position. Any suitable alarm configured to attract the attention of the pilot without monopolizing it will be consistent with the ends of this invention.

Figure 3:
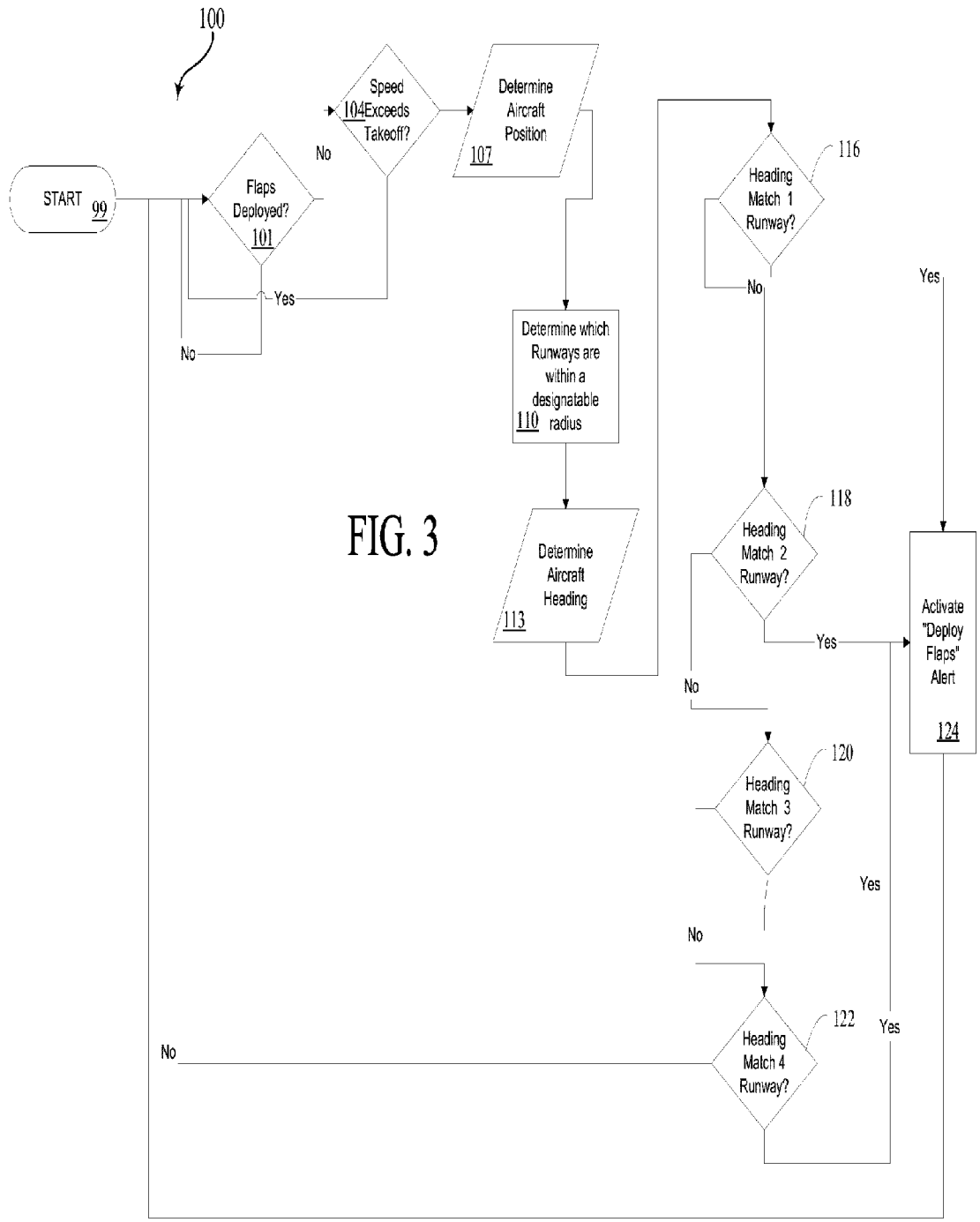
FIG. 3 is a flowchart indicating the method by which non-deployed flaps are indicated prior to take-off.

Referring to FIG. 3, a method 100 for generating a "no flaps" warning, the begins at a start block 99. Start may occur at power up or it may occur later after the recognition of the database 39. Given the purpose of the method 100, it is appropriate that the method 100 begin before the aircraft leaves a taxiway to break the perimeter of the runway as defined in the database 39. If the flaps are in a take off deployment at a block 101, no reason for a warning exists. The block 101 governs a conditional loop that will not allow the method 100 to move on until the flaps are in a position inconsistent with take-off.

When the flaps are in a position other than that of take off, the method 100 optionally moves to determine the speed of the aircraft at a block 104. Where the aircraft speed is in excess of a configured threshold, the action of the aircraft is inconsistent with take-off or with corrective action. The addition of this optional step presumes that the action of the aircraft has been monitored throughout and that the opportunity to warn of an inconsistent flap position has already occurred if the aircraft had come up to speed rather than to slow down to speed. Thus, where the speed is in excess of a configurable speed inconsistent with take-off, there is no need to warn and the method 100 returns to monitor flap position.

At a block 107, the position of the aircraft is determined. In this usage position refers to a locus rather than an attitude or state. The purpose of determining a position is to place the aircraft within the mapped area contained within the database 39 at the block 107. Generally, the determining of the aircraft's position is based upon the receiving a second signal indicative of an aircraft position. The second signal might be from a GPS, from a LORAN device, or from an Inertial Navigation System. Additionally, it may be a signal relayed from the tower. In any event, at the block 104, the method determines an aircraft position.

At a block 110, the method 100 determines whether runways exist within a radius closest to the determined position of the aircraft. Such a determination is based upon a comparing of the aircraft position to the contents of the database 39 and to, by the comparison, determining whether the aircraft position is within a runway perimeter or within a configurable distance therefrom. Positions of runways are not relevant outside of a configurable distance from the aircraft position, the configurable distance being chosen to anticipate entry onto the runway. When the distance is too great, there is no immediate likelihood that the aircraft will immediately begin a take-off maneuver thereby granting greater time for generating an alarm when the aircraft is within the runway perimeter and the flaps position is not the take-off position.

Where, rather than being too far away from a runway, an aircraft is within a designatable radius of two distinct physical runways (in fact, each physical runway is designated as two distinct runways allowing diametrically opposed approaches and landings or take-offs, thereby doubling the number of physical runways), the aircraft will select between the two physical runways based upon a track angle. One such instance is where crossed runways serve a single airport; a second exists where runways are parallel. In either instance, it is important to know which of the runways is the appropriate to determine the intent of the pilot of the aircraft. To that end, the track angle is used.

A track is the resultant direction of actual travel projected in the horizontal plane and expressed as a bearing. A track is the component of motion that is in the horizontal plane and represents the history of accomplished travel. An aircraft develops a track as it moves in the horizontal plane. A track angle is an offset between the aircraft heading angle and the track of a hypothetical aircraft traveling the length of the runway parallel to its lateral edges.

To determine a heading of the aircraft at a block 113 there might be any of several known methods. The easiest of these methods is to determine a heading of the aircraft by compass means. On the ground when taxiing, a heading of the aircraft exactly corresponds with the course over ground because the effect of crosswinds is negligible due to the traction of the tires. Where the aircraft points is where the aircraft goes.

Another method is to determine a first position of the aircraft and a second position of the aircraft, the second position succeeding in time the first by an interval configured to give a good approximation of the general movement of the aircraft. A vector difference in position will determine a direction of movement. The direction of movement is suitable for the purposes of the invention.

Still another non-limiting method of determining a heading is from the FMS 35. The heading for any given movement of the aircraft is readily determined by the FMS 35 for navigational purposes. Other methods that exist will also serve to establish an aircraft heading for the further purpose of establishing a track angle.

The method 110 set forth in FIG. 3 includes a nonlimiting example of the comparison of track angles to determine a runway. In the nonlimiting example, a runway has only its principal direction such that there are two entries for a north-south runway equating to runways 18 and 38 or runways oriented at 180 and 360 degrees respectively. In the nonlimiting example, the aircraft is within the configurable radius of both physical runways and at a speed not in excess of normal runway taxiing. The heading is determined at the block 113 and it is compared with the first runway within the configurable radius at a block 116. If the difference between the runway track angle and the heading exceed the configurable threshold, the method 100 goes on to a block 118, if not, at a block 124, the deploy flaps alert is sounded.

Similarly for each of the decision blocks 118, 120, and 122, the runway track angle is compared to the heading of the aircraft, the method 100 compares them in sequence to the aircraft heading to find the runway to a configurable threshold. When any of the track angles of the runways are within a configurable threshold angular difference between them and the heading, the method proceeds to the block 124 to sound the alert, otherwise, the method returns to the decision block 101 to check if the flaps are deployed.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A processor for generating a warning, the processor comprising:
   a first component configured to receive a first signal indicative of one of a group of flaps positions, the group including the take-off points;
   a second component configured to receive a second signal indicative of an aircraft position;
   a third component configured to compare the aircraft position to the contents of a database and to, by the comparison, determine whether the aircraft position is within a runway perimeter; and
   a fourth component configured to generate an alarm when the aircraft is within the runway perimeter and the flaps position is not in the take-off position.

2. The processor of claim 1, the processor further comprising:
   a fifth component configured to receive an aircraft ground speed; and wherein
   the fourth component is further configured to suppress the alarm when the ground speed exceeds a threshold ground speed.

3. The processor of claim 1, the processor further comprising:
   a sixth component configured to receive an aircraft heading; and wherein
   the third component is further configured to derive a runway track angle indicative of a difference between a direction of the runway retrieved from the database and the aircraft heading; and
   the fourth component is further configured to suppress the alarm when the runway track angle exceeds a threshold runway track angle.

4. The processor of claim 3, wherein:
   the aircraft heading is derived from a vector difference between a first aircraft position and a second aircraft position, the second runway being an aircraft position later in time than the first runway position.

5. The processor of claim 3, wherein:
   the aircraft heading is sensed by a compass.

6. The processor of claim 1, further comprising:
   a seventh component configured to receive a signal from a Flight Management System and based upon the aircraft position determines whether the aircraft is engaged in preparing for take-off; and
   the fourth component is further configured to suppress the alarm when the aircraft is not engaged in preparing for take-off.

7. The processor of claim 1, further comprising:
   the alarm is one of a group of consisting of an audio warning, a warning light, or a written warning on a display.

8. A software code stored upon a machine-readable medium to instruct a processor to generate a warning, the software code comprising:
   a first component configured to receive a first signal indicative of one of a group of flaps positions, the group including a take-off positions;
   a second component configured to receive a second signal indicative of an aircraft position;
   a third component configured to compare the aircraft position to the contents of a database and to, by the comparison, determine whether the aircraft position is within a runway perimeter; and
   a fourth component configured to generate an alarm when the aircraft is within the runway perimeter and the flaps position is not the take-off position.

9. The software code of claim 8, the processor further comprising:
   a fifth component configured to receive an aircraft ground speed; and wherein
   a fourth component is further configured to suppress the alarm when the ground speed exceeds a threshold ground speed.

10. The software code of claim 8, the processor further comprising:
a sixth component configured to receive an aircraft heading; and wherein
the third component is further configured to derive a runway track angle indicative of a difference between a direction of the runway retrieved from the database and the aircraft heading; and
the fourth component is further configured to suppress the alarm when the runway track angle exceeds a threshold runway track angle.

11. The software code of claim 10, wherein:
the aircraft heading is derived from a vector difference between a first aircraft position and a second aircraft position, the second runway position being an aircraft position later in time than the first runway position.

12. The software code of claim 10, wherein:
The aircraft heading is sensed by a compass.

13. The software code of claim 8, further comprising:
a seventh component configured to receive a signal from the Flight Management System and based upon the aircraft position determines whether the aircraft is engaged in preparing for take-off; and
the fourth component is further configured to suppress the alarm when the aircraft is not engaged in preparing for take-off.

14. The software code of claim 8, further comprising:
the alarm is one of a group of consisting of an audio warning, a warning light or written warning on a display.

15. The software code of claim 14, wherein:
the audio warning is a voice warning.

16. A method for generating warning, the method comprising:
receiving a first signal indicative of one of a group of flaps position, the group including a take-off position;
receiving a second signal indicative of an aircraft position;
comparing the aircraft position to the contents of a database and to, by the comparison, determining whether the aircraft position is within a runway perimeter; and
generating an alarm when the aircraft is within the runway perimeter and the flaps position is not take-off position.

17. The method of claim 16, further comprising:
receiving an aircraft ground speed; and
suppressing the alarm when the ground speed exceeds a threshold ground speed.

18. The method of claim 16, the method further comprising:
receiving an aircraft heading;
deriving a runway track angle indicative of a difference between a direction of the runway retrieved from the database and the aircraft heading; and
suppressing the alarm when the runway track angle exceeds a threshold runway track angle.

19. The method of claim 18, wherein:
deriving the aircraft heading includes calculating a vector difference between a first aircraft position and a second aircraft position, the second runway position being an aircraft position later in time then the first runway position.

20. The method of claim 16, further comprising:
receiving a signal from a Flight Management System and based upon the aircraft position determines whether the aircraft is engaged in preparing for take-off; and
suppressing the alarm when the aircraft is not engaged in preparing for take-off.

* * * * *